United States Patent

[15] 3,638,495

Sessler

[45] Feb. 1, 1972

[54] METHOD FOR DETECTING AGING OF ARTICLES

[72] Inventor: Donald R. Sessler, Temple City, Calif.

[73] Assignee: Dynametric, Inc., Pasadena, Calif.

[22] Filed: Aug. 7, 1968

[21] Appl. No.: 750,810

[52] U.S. Cl. .....................................73/362 AR, 73/339 R
[51] Int. Cl. ..........................................G01k 3/04, G01k 7/24
[58] Field of Search ...............................73/339, 362 SE, 358

[56] References Cited

UNITED STATES PATENTS

| | | | |
|---|---|---|---|
| 2,614,430 | 10/1952 | Ballard et al. | 73/358 |
| 3,344,670 | 10/1967 | Olsen et al. | 73/356 |
| 3,102,425 | 9/1963 | Westman et al. | 73/362 SL |
| 3,170,860 | 2/1965 | Morin | 73/358 X |
| 3,344,343 | 9/1967 | John | 324/29.5 |

Primary Examiner—Louis R. Prince
Assistant Examiner—Frederick Shoon
Attorney—Reed C. Lawlor

[57] ABSTRACT

An age indicator which indicates the effect of temperature on the useful life of articles, particularly unused photosensitive sheet material, is exposed to the same temperature conditions as the article itself. The age indicator deposits metal or other material by electrochemical deposition in accordance with Faraday's law. The rate of deposition is made proportional to the known aging rate of the article at various temperatures, so that a correct indication of aging can be obtained even though the article is exposed to unknown, widely variable, temperature conditions. The age indicator is conveniently placed in close proximity to the article, such as inside a container with the article, thereby being exposed to the same unknown, widely variable, temperature conditions as the article itself. Such temperatures occur, for example, in the transportation or storage of articles through or in zones of extremely high temperatures. During the period of exposure, the age indicator will provide an indication of the remaining or consumed useful life of the article.

2 Claims, 9 Drawing Figures

METHOD FOR DETECTING AGING OF ARTICLES

CROSS-REFERENCE TO RELATED APPLICATIONS

U.S. Pat. application Ser. No. 740,053, filed June 26, 1968, now U.S. Pat. No. 3,561,270.

U.S. Pat. application Ser. No. 798,060, filed Feb. 10, 1969, now U.S. Pat. No. 3,543,582.

This invention relates to a method for indicating the effect of exposure of various kinds of articles, particularly photosensitive sheet material, to varying temperature conditions which cause the articles to deteriorate or age at different rates depending upon the temperature.

It is well known that many kinds of articles, such as unused or undeveloped photosensitive sheet material, food, and chemicals, deteriorate with age. Furthermore, it is well known that the aging rate, or rate of deterioration, varies greatly with temperature. The invention will be described with particular reference to photosensitive sheet materials such as photographic film. Unless otherwise stated, the term photographic film as used herein refers to unused photographic film, that is, film that has not been exposed to light or, if it has been exposed, still remains undeveloped. However, it will be obvious to those skilled in the art that the novel method described herein may be useful with various other articles such as those enumerated above.

Manufacturers date packages of photographic film to indicate the time before which the film should be used with the expectation that its original photographic properties still remain. Such dating often assumes that the film is stored at or about normal atmospheric temperature for most of the time before it is actually used. Bust such dating is unreliable if the film is exposed to unanticipated specified atmospheric-temperature conditions. For this reason, manufacturers often supply data as to the life to be expected if the film is stored at different specific temperatures. For example, the life may be 2 years or 2 weeks depending on the temperature of storage.

DEFINITION

In order to facilitate the further explanation of this invention it is desirable to introduce several terms to describe the aging properties of an article being tested. As used herein with reference to photographic film, the term specified or rated life means the period during which it is considered that the film may almost certainly be used successfully if it has been stored at a specific temperature. If the film is stored at a lower temperature, the actual life of the film will be longer than the specified life. While film may often be used at a later time with some degree of success, it is customary to specify a life which is an assured useful life or life expectancy. This specified or rated life applies only if the film is maintained at the specified temperature. The actual life of the film will be longer if the film is maintained at a temperature lower than the specified temperature. Conversely, the actual life of the film will be shorter if it is maintained at a temperature higher than the specified temperature.

By way of example, one type of photographic film, to which the invention has been applied, had a specified life of 6,900 hours at 80° F. and a specified life of only 1,080 hours at 100° F.

Three other terms necessitating definition are aging rate, doubling temperature, and standard age unit.

In effect, the aging rate or deterioration rate of an object varies with temperature. By way of example, in the case of the film mentioned, the aging rate is twice as great at 80° F. as it is at 72.8° F. The temperature rise that causes the aging rate to double is referred to as the aging-rate doubling temperature. In this case, the doubling temperature is 7.2° F.

Inasmuch as the expected life of an article, such as a roll, spool, or reel, of photographic film, varies with temperature, it is desirable to describe the amount of life consumed as a result of exposure to varying temperature conditions and the amount of life remaining, in terms of the specified life at a particular temperature. For example, in the case of the photographic film mentioned, the specified life may be considered that which is specified for the film at 80° F. For convenience we refer to each hour of specified life at that temperature as a standard age unit. This film, then, has a specified life of 6,900 standard age units. This is the specified life of the film in terms of standard age units, regardless of the temperature to which the film is exposed. By way of example, if this particular film is stored at 72.8° F. for 100 hours, only about 50 standard age units are expended. This is because the aging rate at 72.8° F. is only one-half of the aging rate of 80° F. Similarly, assuming a constant doubling temperature over the temperature range in question, if the film is stored at 137.6° F. for about 24 hours, a total of about 6,144 (that is 24×256) standard age units are consumed. Stated differently, each day of storage at about 138° F. is equivalent to about 9 months of storage at about 80° F. It is therefore clear that it is important that account be taken of the temperature history of a roll of photographic film before using it for its intended purpose.

If one maintains records of the temperatures to which the film is exposed and the periods of exposure to different temperatures, he may be able to estimate the residual specified life of the film remaining after such exposure. To say the least, this method of determining residual specified film life is rather tedious. Furthermore, it is unsuitable for use where the temperature history of the film is unknown.

ILLUSTRATIVE PROBLEM, OBJECTS, AND GENERAL SOLUTION

By way of example, film is often shipped to or through locations with tropical climates. Various vehicles of transportation are utilized for this purpose and the film is usually detained for periods of time at airports and on docks. This results in exposure of the film to a wide range of temperatures, often including high atmospheric-temperature conditions such as temperatures above 100° F. The difficulty of maintaining accurate records of such a temperature history are recognized at once. Therefore, it is desirable to provide a method by which the remaining specified life of an article is indicated so that a potential user of the article may be warned either that the article's useful life has expired or that the article should be tested before use for certain properties which may have deteriorated, such as a reduction in the definition-producing capabilities of film.

One object of this invention is to provide a simple, inexpensive, accurate method for indicating the cumulative effect that exposure of an article to widely varying temperatures has on the life of an article.

Another purpose is to provide a convenient method of indicating the cumulative effect that exposure of film during shipment to widely varying, unknown, temperature conditions, including some above 100° F., has on the life of the film.

In this invention, an age indicator suitable for indicating the cumulative effect of aging of an article at various temperatures is exposed to the same temperature conditions as the article. The standard age units of the article which have been expended as a result of the temperature history of the article are then determined and the residual specified life of the article in standard age units is calculated or indicated.

DRAWINGS

The foregoing and other advantages, features, and characteristics of this invention are described below in connection with the following drawings wherein.

DESCRIPTION IN THE CLAIMS

In the method of this invention, the aging effect of varying temperature conditions on an article being monitored is integrated by employing a simple age indicator. In the type of age indicators employed in this invention an electrical current is developed which is proportional to the aging rate of the article at each temperature, and this current is integrated in an electrochemical cell. The proportionality of the current to the aging rate may be obtained automatically or manually. The time integral of the current is proportional to the change in age in standard age units which have been consumed. The total specified life, when the amount of standard age units consumed has been subtracted, represents the residual specified life of the article in standard age units remaining at the end of the monitoring period.

In one of the devices employable in this invention, the change in current is achieved by continually changing a voltage as a function of the temperature to which the article is exposed. This voltage is applied to a nonohmic resistor to produce a current which is proportional to the aging rate and the current is integrated.

Figure 1:
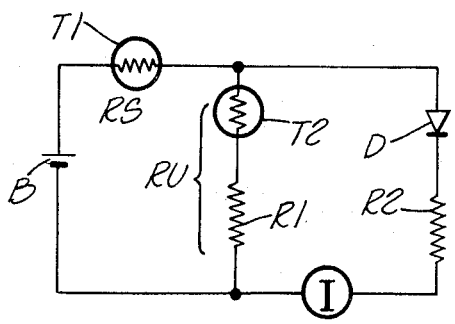
FIG. 1 is a schematic diagram of an electrical circuit of the type employable in this invention.

The best example of this type of device is illustrated in FIG. 1 where the nonohmic resistor has a resistance which falls rapidly as the voltage is increased, thus making it possible to continually match the aging characteristic of an article whose aging rate varies rapidly with temperature. In this device, the best results have been obtained where the nonohmic resistor is provided by a forwardly connected diode of the semiconductive type.

A diode of the type employed in this device is a semiconductive device. When current flows in one direction the resistance of the device is relatively low. This is the "forward" direction. When the current flows in the opposite direction the resistance is very high. This is referred to as the "reverse" direction. In a diode, the resistance, that is, the ratio of voltage to current, depends upon the voltage.

In the age indicator illustrated in FIG. 1 and described in U.S. Pat. application Ser. No. 740,053 filed on June 26, 1968 by Donald R. Sessler, a shunt circuit RU is connected in series with a series circuit RS across small battery B. A diode D, a fixed resistor R2, and a microcoulometer I in the form of an electrochemical cell that operates on the principles of Faraday's law are connected in series across the ends of the shunt circuit RU. The diode is connected in the forward direction.

In this age indicator the series circuit RS consists of a thermistor T1 and the shunt circuit RU consists of a fixed resistance R1 connected in series with another thermistor T2. The series circuit RS and the shunt circuit RU have different resistance-temperature characteristics so that the voltage appearing across the shunt circuit RU varies with temperature. The elements are so selected that as the temperature rises, the voltage across the shunt circuit RU increases. The conductivity of the diode depends upon the voltage across it, in this case, the voltage across the shunt circuit RU, as well as its temperature.

Figure 2:
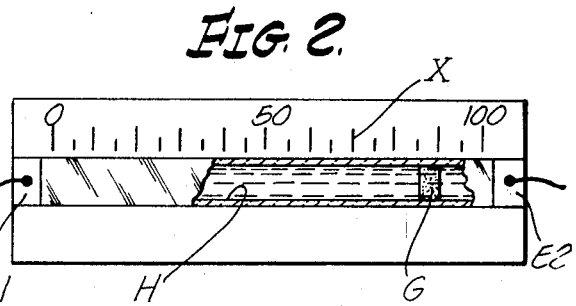
FIGS. 2 and 3 are diagrams representing integrators of the type employable in this invention.

The microcoulometer I constitutes a time-current integrator. The best type of microcoulometer now known is in the form of an electrochemical cell which operates in accordance with Faraday's law and which has come to be commonly known as a Curtis meter. Microcoulometers of this type are shown in FIG. 2 and are described for example in Beusman U.S. Pat. No. 3,343,803, and John U.S. Pat. No. 3,344,343.

As indicated in FIG. 2 such a Curtis meter comprises essentially a capillary tube having two electrical terminals E1 and E2 at opposite ends of a bore H, with a body of liquid mercury (Hg) nearly filling the bore H in the space between the terminals. The unoccupied portion forms a gap G which is filled with an electrolyte such as a water solution of a mercury salt such as mercury iodide.

As is well known, when electrical current flows through such a cell from one terminal to the other, mercury atoms are transported across the liquid gap G causing the gap to move from one end of the cell to the other. Indicator marks X are located along the length of the Curtis meter to facilitate measuring the degree of movement of the gap G and hence indication of the change in the age of the article. With the circuit elements described, the percentage or fraction of standard age units remaining in the article is indicated directly by appropriate numerals 0, 50, 100, or other indicia, on the wall of the cell. The gap movement is a slow process and therefore very appropriately used in determining the total electrical charge that has flowed through the cell over a long period of time. In one embodiment of this invention, the rate of movement of the gap is always proportional to the aging rate at all temperatures to which both the article and the age indicator are jointly exposed. Consequently, the amount of gap movement represents the time integral of the aging rate in standard age units. Stated in another way, the amount of gap movement provides an indication of the integral of the current flow through the cell which integral is in turn a measure of the extent of aging of the article.

Figure 3:
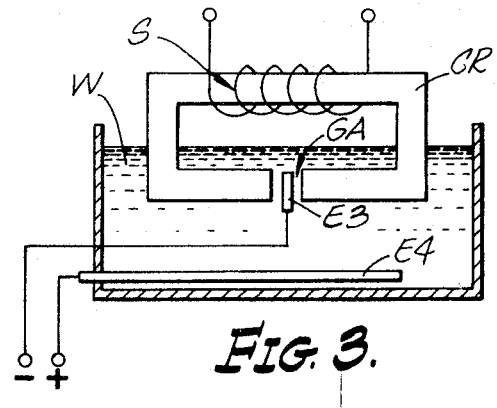

Another type of microcoulometer I which might be employed in this invention is a magnetic core cell illustrated in FIG. 3 and described, for example, in Alexander U.S. Pat. No. 3,268,803. As indicated in that patent, a magnetic core or loop CR of a ferromagnetic material is partially immersed in a bath W of a dissolved salt of a ferromagnetic element, such as an aqueous solution of ferrous ammonium sulfate. An electrode E3 of a nonferromagnetic material is located within a narrow gap GA between opposed parallel pole faces in the magnetic core CR. A second electrode E4 composed of a ferromagentic material is also immersed in the bath W.

The magnetic core cell is connected into the circuit illustrated in FIG. 1 as microcoulometer I. In operation the electrode E3 is the negative terminal of the cell, making it the cathode. The electrode E4 is the positive terminal of the cell, making it the anode. The current which is to be integrated, is supplied to these two electrodes whereby ferromagnetic material is deposited from the bath W onto the electrode E3. The amount of metal deposited on the electrode E3 is proportional to the total current passed through the electrodes E3 and E4. The metal electroplated on the electrode E3 will, in turn, increase the magnetic susceptance of the magnetic core CR by an amount which is proportional to the integral of the current applied to the two electrodes.

Readout means for measuring and indicating the degree of change of magnetic susceptibility of the core CR includes sensing coil S wound about core CR.

In a typical age indicator employed in this invention, a battery is employed that supplies a voltage which is substantially independent of temperature.

In order to employ one of the above-mentioned age-indicating devices in conformance with the method of this invention to indicate the life consumed or life remaining of an article under test, the device is placed with the article wherever it is stored or carried, thereby being exposed to the same temperature history as the article itself. Under these circumstances when the temperature changes, thereby altering the aging rate of the article, the current of the age indicator is simultaneously altered in a corresponding manner. By suitable calibration of the microcoulometer I, the integrated value of the current flowing through the integrator I as a function of time represents the number of standard age units of the specified life which remain.

Figure 4:
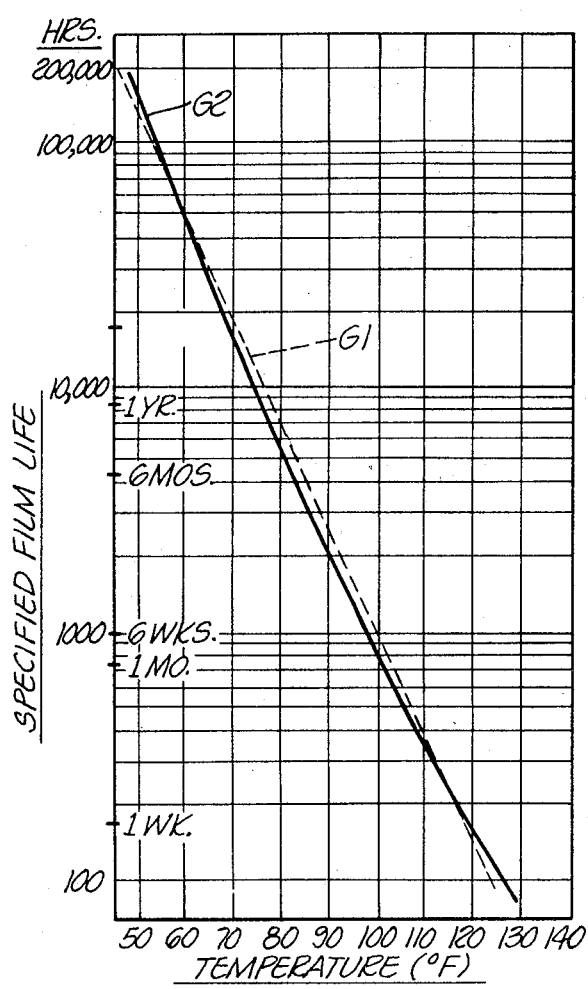
FIG. 4 is a graph indicating how the specified life of a particular photographic film varies with temperature, and illustrating the accuracy with which the residual specified life of an article may be measured by employing the method described herein.

In FIG. 4, the specified life of a particular type of photographic film is shown as a function of temperature as Graph G1. This graph represents how the shelf life, specified by the manufacturer, varies with temperature. The film having the characteristic represented in FIG. 4 has an aging rate which varies rapidly with temperature. The doubling temperature is nearly constant, being about 7.2° F. through a wide range of temperatures from about 50° F. to about 130° F. The aging characteristics of this film can be closely approximated over the temperature range with an age indicator of the type described herein when employed in conformance with the methods of this invention. Such close approximation may be seen from considering Graph G2 of FIG. 4 wherein the time indicated by an ordinate of the graph represents the time required, for example, for the gap G (See FIG. 2) to move from the 100 position to the 0 position of the Curtis meter when the age indicator is maintained at the temperature represented by the corresponding abscissa. Thus, if the age indicator is maintained at a temperature at 80° F., 6,900 hours are required for the gap to move from the 100 position to the 0 position on the meter. This corresponds to the specified life of the film at that temperature. Regardless of the temperature history of the article and the age indicator, the scale on the Curtis meter indicates the percentage of the specified life that remains in terms of standard age units and hence also the percentage of the specified life that has been consumed. However, in order to obtain the high degree of accuracy illustrated in FIG. 4, it is necessary that the method of this invention be utilized in order to insure that the age indicator is exposed to the same temperature history as the article being monitored, regardless of the type of age indicator employed.

Figure 5:
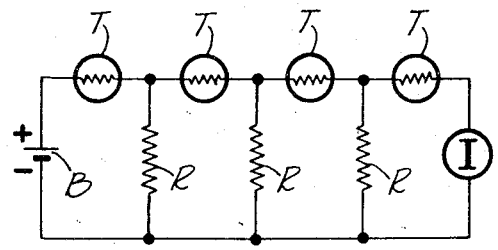
FIG. 5 is a schematic diagram of another electrical circuit of the type employable in this invention.

In another embodiment utilizing the method of this invention, a ladder network circuit of the type shown in FIG. 5 is employed. This type of device is particularly useful where the size of the age indicator is not an important factor.

In this age indicator four thermistors T and three fixed resistors R are connected together in an electrical circuit across a battery B to form a ladder network circuit. The microcoulometer I is connected across the last fixed resistor R.

The method of operation of this device is similar to that which has been previously described for the device illustrated in FIG. 1. Here, however, the three thermistor and resistor combinations are used in place of the diode. By way of example, the elements of each thermistor-resistor L-circuit may be so selected to produce a current which doubles every 28° F. When three such thermistor-resistor legs are placed in series, an output current will be produced which doubles every 28° F./3 or 9.33° F.

Here again any of the various microcoulometers of the type mentioned above may be utilized.

In order to employ this age-indicating device in conformance with the method of this invention to indicate the life consumed or remaining life of the article under test, the device is placed with the article wherever it is stored or carried, thereby being exposed to the same temperature history of the article itself. Under these circumstances when the temperature changes, thereby altering the aging rate of the article, the current of the age indicator is altered in a corresponding manner. By suitable calibration of the microcoulometer I, the integrated value of the current flowing through the integrator I as a function of time represents the number of standard age units of the specified life which have been consumed during the period of exposure.

The method of this invention may also be practiced by utilizing a device which does not employ a thermistor, but in which the current flowing through the selected integrator I is regulated manually. This is accomplished, for example, by employing a circuit such as that shown in FIG. 6 and described in U.S. Pat. No. 3,561,270 by Donald R. Sessler. In this arrangement, the thermistor T1 of FIG. 1 has been replaced by a rheostat RH having a movable arm A bearing a pointer movable across a scale SC that has been calibrated with respect to temperature. At each temperature setting on the scale SC, the current through the integrator is approximately proportional to the aging rate of the article being monitored. Such a device may be best used in accordance with this invention, for example, where film is being stored for long periods of time at varying temperatures such as in a mobile camera truck.

Figure 7:
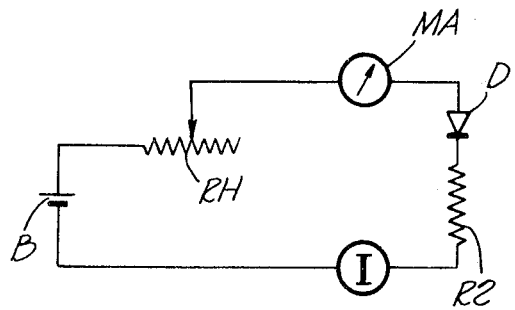

Another such device is illustrated in FIG. 7 and described in U.S. Pat. No. 3,561,270 by Donald R. Sessler, where the rheostat RH is connected in series with a microammeter MA, a diode D, a protective resistor R2, and an integrator I. In this arrangement, the microammeter MA is calibrated in terms of temperature, so that when the pointer of the microammeter MA is opposite a point corresponding to that temperature the current flowing through the diode D is proportional to the aging rate of the film.

Figure 6:
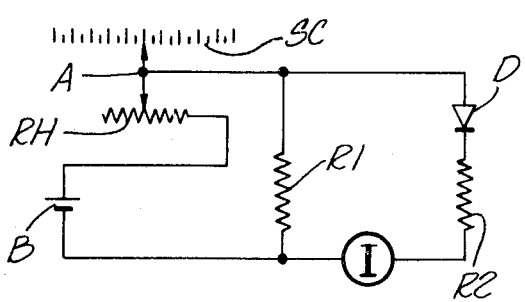
FIGS. 6 and 7 are schematic diagrams of manually adjustable age indicators of the type employable in this invention.

In the devices of the type illustrated in FIGS. 6 and 7, when the temperature condition changes, the sliders of the rheostats are moved manually to a position corresponding with the temperature to which the article is exposed in order to cause the current flowing into the diode to be proportional to the aging rate of the film or other article at that temperature.

In order to utilize the age-indicating devices of the type illustrated in FIGS. 6 and 7 in conformance with the method of this invention to indicate the life consumed or the life remaining of an article under test, the device is conveniently placed near to the article wherever it is stored or carried. Under these circumstances when the temperature changes, thereby altering the aging rate of the article, the temperature change is detected and the current of the age indicator is manually adjusted as set forth above in order to correspond with the changed aging rate of the article.

Devices of the type illustrated in FIGS. 6 and 7 are particularly suitable for use in the method of this invention where film or some other aging article is exposed for long periods of time to different temperature conditions and where such changing temperatures can be anticipated so that the current flowing through the integrator I can be adjusted as required. Such a condition might exist, for example, where film is temporarily stored or deposited on docks or in mobile camera trucks.

Figure 8:
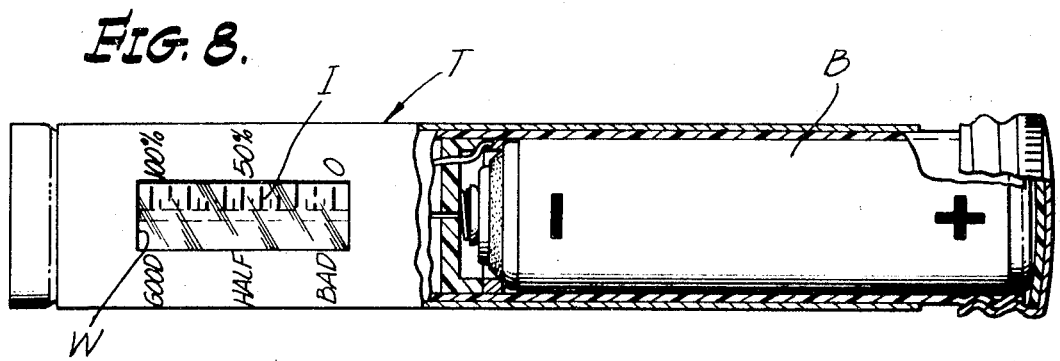
FIG. 8 is an elevation view of an age indicator of the type employable in this invention with the outer surface thereof partially cut away to show a certain type of construction.

As has been previously stated, the method of this invention is particularly useful in determining the useful remaining specified life of film. Film is often shipped for great distances and subjected to widely varying, unknown, temperature conditions. In the best embodiment of this invention, an age indicator of the general type previously described is inserted into a small cylindrical tube T of the type illustrated in FIG. 8 and described in U.S. Pat. No. 3,543,582 by Donald R. Sessler. Inside of the tube T, a battery B and a coulometer I, in conjunction with an age indicator of the type described herein, are suitably mounted so that an indication of the remaining and expended specified life of the article may be read through the window W.

Figure 9:
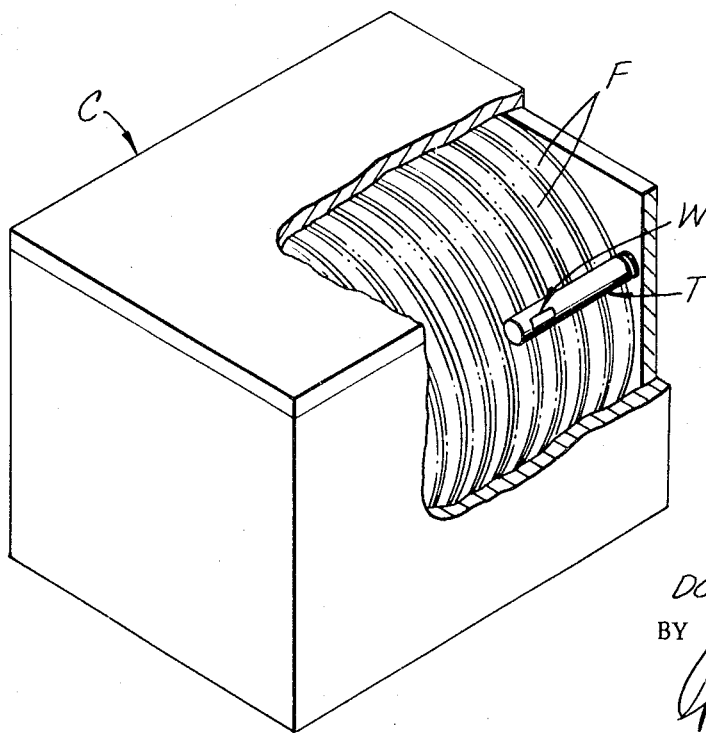
FIG. 9 is a perspective view of a case of film cans with the outer surface of the case partially cut away to show a preferred embodiment of this invention.

The tube T is heat conductive, being constructed, for example, of a thin plastic material, and is of such size that it may be conveniently inserted, for example, into a shipping case or carton C with film cans F as illustrated in FIG. 9. In conformance with the method of this invention, the age indicator is then assured of being exposed to the same temperature history as the cans of film.

Containers of types other than those illustrated in FIG. 9 are often employed with other articles for which it is desirable to determine the remaining useful life. In such situations, for example, it may be impossible to place an age indicator inside of a container with the article. However, the method of this invention may nevertheless be used by placing the age indicator near the container, such as on top of the container, whereby the age indicator will be exposed to the same temperature history as the article itself.

It is thus seen that a method is provided employing an age indicator to indicate the effect of temperature on the useful life of an article wherein the age indicator is simultaneously exposed to the same temperature conditions as the article itself, thereby producing an electrochemical deposition proportional to the aging rate of the article at various temperatures so that the correct measure of aging is obtained.

It is to be understood that the method of this invention is not limited to the specific devices disclosed nor to use with the specific articles mentioned but may employ other age indicating devices with other aging articles.

The invention claimed is:

1. In a method of accurately indicating the cumulative aging effects of temperature on the useful life of photosensitive material by means of an electrochemical age indicator, which photosensitive material is characterized by an aging rate which varies as a function of temperature and which is shipped from one point to another over a course along which the photosensitive material is exposed to unknown and variable temperature conditions, including some involving long durations at high atmospheric-temperature conditions, the steps of:

inserting said electrochemical device into a container with said photosensitive material,
   exposing said container together with its contents to variable temperature conditions, including some high atmospheric-temperature conditions, during shipment,
   continually detecting changes in the temperature inside of said container such shipment,
   continually developing an electrical current in said electrochemical device during such shipment,
   continually adjusting the magnitude of the current in accordance with the detected temperature to cause the current to vary in proportion to the aging rate of said photosensitive material,
   depositing a material in said electrochemical device at a rate proportional to the current during the shipment,
   measuring the amount of material that was deposited during the course of the shipment to provide an indication of the exact extent to which the photosensitive material has aged during the period of shipment,
   the measurement being made at the termination of said exposure to ascertain whether the specified life has been consumed; and
   then testing a limited portion of said photosensitive material to determine whether the actual useful life of the material has been consumed.

2. In a method of accurately indicating the cumulative aging effects of temperature on the useful life of an article composed of material subject to aging by means of an electrochemical age indicator, which material is characterized by an aging rate which varies as a function of temperature and which is shipped from one point to another over a course along which the material is exposed to unknown and variable temperature conditions, including some involving long durations at high atmospheric-temperature conditions, the steps of:

inserting said electrochemical device into a container with said material,
   exposing said container together with its contents to variable temperature conditions, including some high atmospheric-temperature conditions, during shipment,
   continually detecting changes in the temperature inside of said container during such shipment,
   continually developing an electrical current in said electrochemical device during such shipment,
   continually adjusting the magnitude of the current in accordance with the detected temperature to cause the current to vary in proportion to the aging rate of said material,
   depositing a material in said electrochemical device at a rate proportional to the current during the shipment,
   measuring the amount of material that was deposited during the course of the shipment to provide an indication of the extent to which the material has aged during the period of shipment, the measurement being made at the termination of said exposure to ascertain whether the specified life has been consumed; and
   testing a limited portion of said material to determine whether the actual useful life of the material has been consumed.

* * * * *